United States Patent [19]

Hams et al.

[11] 4,172,525
[45] Oct. 30, 1979

[54] DOCUMENT SORTER

[75] Inventors: Kenneth A. Hams, Nazareth, Pa.; Lester H. Stocker, Phillipsburg, N.J.

[73] Assignee: Bell & Howell Company, Phillipsburg, N.J.

[21] Appl. No.: 859,074

[22] Filed: Dec. 9, 1977

[51] Int. Cl.² .............................................. B07C 9/00
[52] U.S. Cl. .................................... 209/564; 209/900
[58] Field of Search .................. 209/71, 72, 73, 74 R, 209/74 M, 559, 563, 564, 569, 583, 900; 198/339, 348; 271/64, 173, 258, 259

[56] References Cited

U.S. PATENT DOCUMENTS

| | | | |
|---|---|---|---|
| 3,087,612 | 4/1963 | Duncan et al. | 209/74 R |
| 3,352,417 | 11/1967 | Cutaia | 209/74 R |
| 3,460,673 | 8/1969 | Sanner | 209/73 |
| 3,904,516 | 9/1975 | Chiba et al. | 209/74 M |

*Primary Examiner*—Joseph J. Rolla
*Attorney, Agent, or Firm*—Griffin, Branigan & Butler

[57] ABSTRACT

A binary sorting code is read from documents and transmitted to a sorting machine where the code for each document is decoded and used to direct the document to a specific stacker. Cycling of the sorter is controlled by a sequencer responsive to timing pulses from a shaft encoder. Each sequence cycle is initiated by a flip-flop circuit responsive to a document detector. An additional flip-flop provides for fault detection in the system.

10 Claims, 3 Drawing Figures

DOCUMENT SORTER

BACKGROUND OF THE INVENTION

This invention relates to a document processing machine and more particularly a document sorter to be used in conjunction with an inserter or the like with an independent drive.

It is known in the art of mail sorting to detect codes on individual documents and thereby control stackers before and after postal meters. An example of such a system is disclosed in U.S. Pat. No. 3,652,828 to Sather et. al. and assigned to the assignee of the present invention. In such systems, an inserter and all stackers are synchronized to a single drive so that each stacker operates on the same machine cycle as the inserter. A disadvantage of such systems is that all stackers must be manufactured as a single unit or at least have a drive connection between all units.

It is an object of this invention to provide a document sorter having a plurality of stackers which need have no mechanical connection to the code reading station other than electrical connectors at the intersection of conveyors.

It is a further object of this invention to provide a document sorter which accepts a coded location signal and automatically sorts the documents without any requirement of a mechanical drive connection with the code reading machine.

It is also an object of this invention to provide an independent cycling control system whereby a sequence of sorter functions may be controlled.

SUMMARY OF THE INVENTION

In a document processing machine, timing signals are developed from an encoder on a continuously-rotating drive means. A sequence of parallel control signals are developed in a sequencer responsive to the timing signals and initiated by a document detection signal. Certain of the control signals connect operative elements of the document processing machine to the continuous drive.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT OF THE INVENTION

Figure 1:
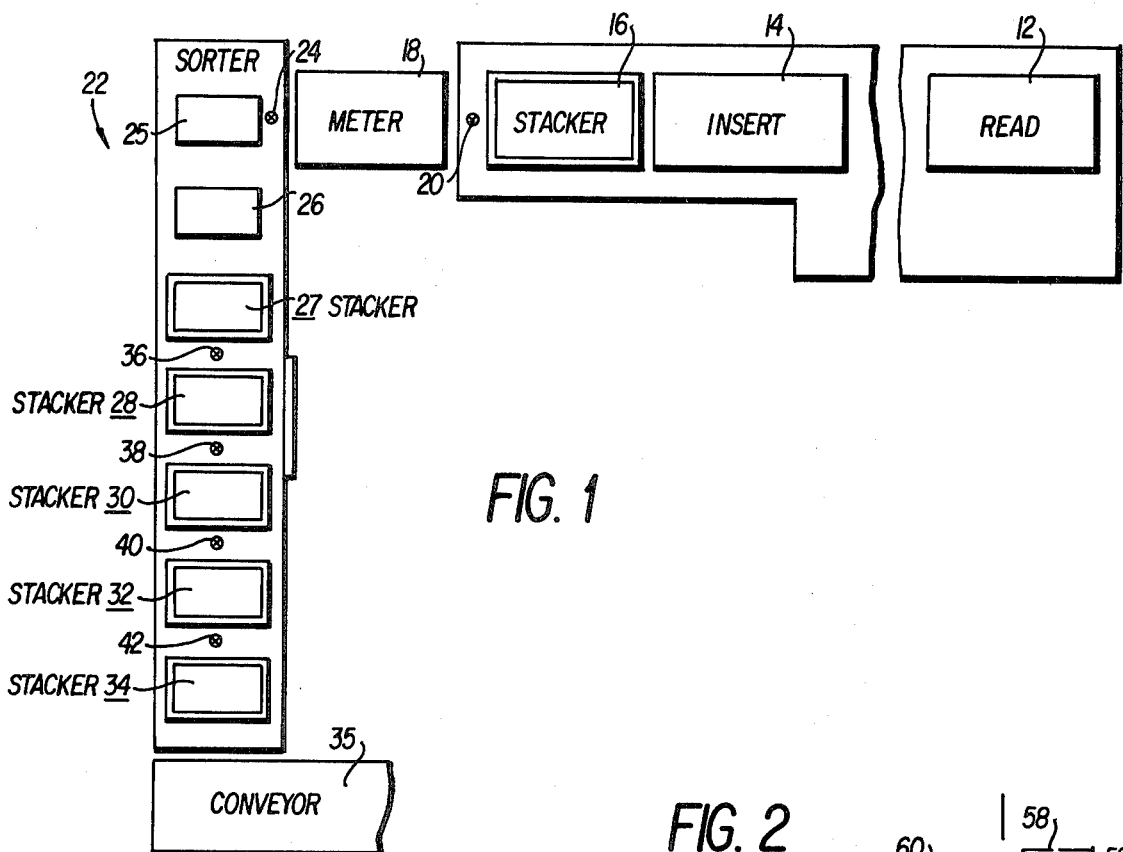
FIG. 1 is a general layout of a sorting system embodying the present invention.

FIG. 1 shows the general layout of an inserting, metering, and sorting system for which the present invention was developed. Prior to insertion in envelopes, the codes on documents are read at a station 12. The code reader is a three-position read amplifier mounted on the inserter machine. The inputs may be obtained directly from phototransistors for hole-reading or from the outputs of a fiber optic module in the case of hyphen-reading. Power for the amplifier is provided by the sorter control system to be described. Once the sorting code has been read at station 12, the document is inserted in a conventional envelope by inserter 14, thereby making further code reading impossible. Once the document has been inserted, it may be diverted into a stacker 16 or passed across a postage meter 18, depending on the sorting code read at station 12. Documents passing onto postage meter 18 are detected by a photodetector 20.

After a document passes over postage meter 18, it passes onto a conveyor on sorter 22 and is detected by a photocell 24. According to the invention, the sorter 22 will be indexed through one machine cycle each time a document is detected by photocell 24. With the first machine cycle after a document enters the sorting machine 22, the document will move from a position 25 to position 26. In the next cycle, initiated by a subsequent document entering the sorter, the first document will be moved from position 26 to a position below stacker 27. At the start of each machine cycle, a stacker will be activated if a document coded for that stacker was moved to a position below that stacker in the previous cycle. In any case, at a time within the sorter cycle, but after actuation of any stackers, the sorter will be indexed and a document not taken up by stacker 27 will be moved on to a position below stacker 28. The sorter will continue to be indexed as each document crosses photocell 24 and thus a document not taken up by a stacker will be moved on past stackers 30, 32, and 34 to an output conveyor 35. Photocells 36, 38, 40, and 42 are located between each stacker to give an indication of a misfed sheet between cycles.

Figure 2:
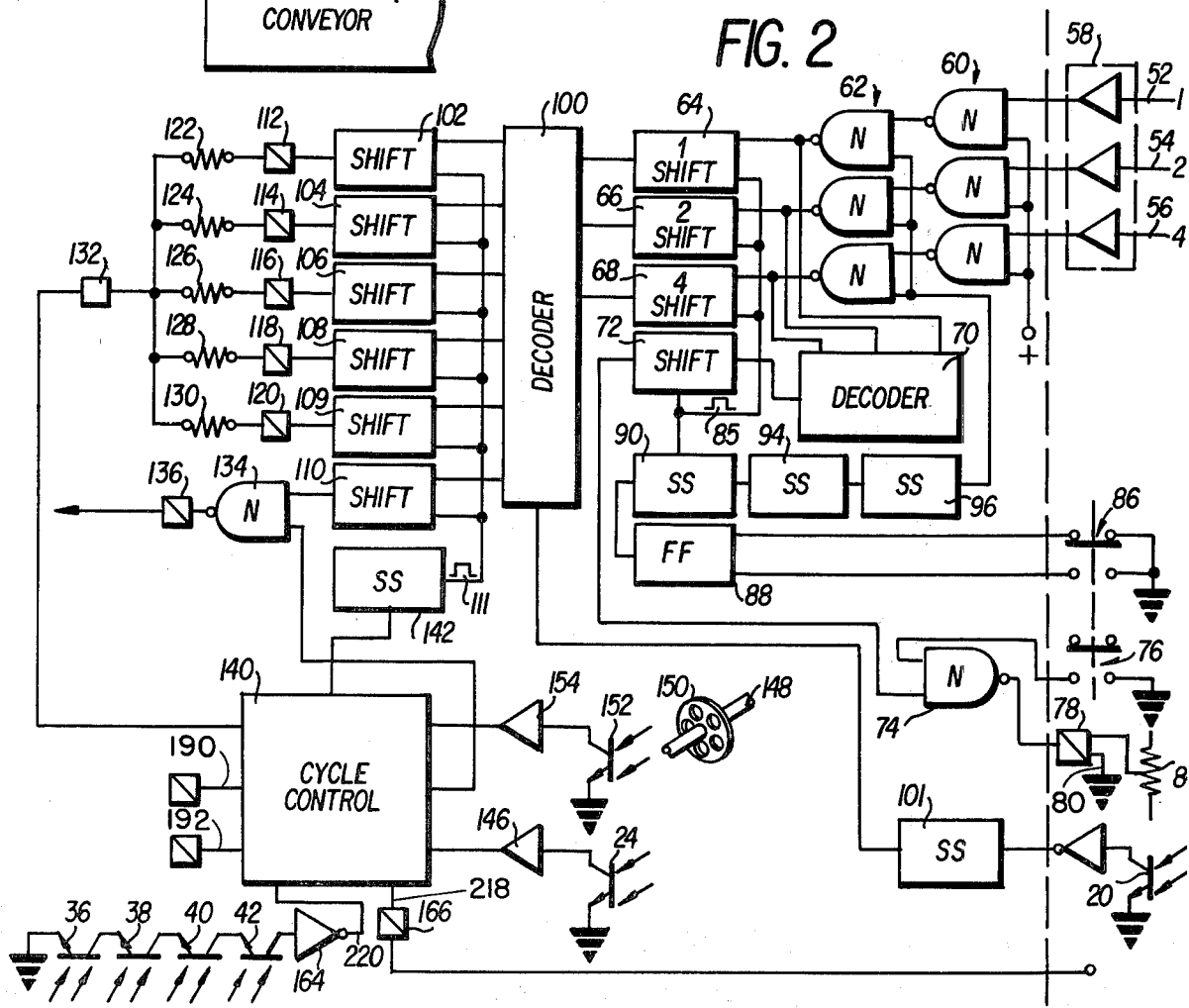
FIG. 2 is a schematic diagram of a sorter control system responsive to coded location signals.

Referring now to FIG. 2, a general description of the sorter control system will be given. The three-bit binary code read from each document at read station 12 is passed in parallel along lines 52, 54, and 56 through a read amplifier module 58 to circuitry mounted on the sorter.

The following code is illustrative of a code that can be used to indicate the desired sorter location for each document:

| Envelope Destination | CODE | | |
|---|---|---|---|
| | 4 | 2 | 1 |
| Conveyor | 0 | 0 | 0 |
| Sorter-Stacker 1 | 0 | 0 | 1 |
| Sorter-Stacker 2 | 0 | 1 | 0 |
| Sorter-Stacker 3 | 0 | 1 | 1 |
| Sorter-Stacker 4 | 1 | 0 | 0 |
| Sorter-Stacker 5 | 1 | 0 | 1 |
| Diverter Before Meter | 1 | 1 | 0 |

The binary code 111 may be used, for example, to control an envelope marker or to indicate an incorrect code reading.

The three-bit binary code is read in parallel through NAND gates 60 and strobed through NAND gates 62 to the input stages of inserter shift registers 64, 66, and 68. The outputs of NAND gates 62 are also connected in parallel to a BCD to decimal decoder 70. Where appropriate, the decoder applies a signal to the input stage of shift register 72 with a code of 110 indicating that the document is to be diverted before the meter. Once a divert stacker signal has shifted through shift register 72, it will be applied as one input to NAND gate 74. At a specific time within the inserter cycle, cam operated switch 76 will be moved into the position shown resulting in a low output from NAND gate 74. This low output will be applied to relay 78 which closes a contact between lines 80 and 82. With line 80 thus connected to ground, solenoid 84 will be actuated to activate the divert stacker 16.

Shift registers 64, 66, 68 and 72 are clocked by a signal 85 derived from the inserter to shift the registers at the start of each machine cycle of the inserter. The shift registers are programmable to store code signals and a divert signal for the number of cycles required for a document to move from the reader station to a position below the divert stacker 16 in the case of shift register 72 and to the postage meter 18 in the case of shift registers 64, 66, and 68.

As noted above, clock signal 85 is derived from a signal from the inserter. Accordingly, a cam operated switch 86 moves to the position shown at the start of each inserter machine cycle. With the switch moved to the position shown, flip-flop 88 will change state and trigger a one-shot 90. One-shot 90 provides the clock signal 85 indicating the start of an inserter machine cycle as well as a trigger to one-shot 94 which, in turn, triggers one-shot 96. One-shot 96 provides a read strobe on line 98 to NAND gates 62 two bit times after the inserter shift registers have been shifted by clock 85. Thus, at the start of each inserter machine cycle the inserter shift registers are shifted one position and immediately thereafter, the code of the next document is strobed into the inserter shift registers.

Once the code bits have been shifted through the inserter shift registers, they are decoded in a BCD to decimal decoder 100. Decoding is in response to a strobe signal from one shot 101 which is triggered by photocell 20 before the postal meter 18. For each code word indicating a sorter stacker or the output conveyor, one signal will be transferred to a respective sorter shift register 102, 104, 106, 108, 109 or 110. The sorter shift registers are also programmable and will shift with each clock pulse 111 indicative of the start of a sorter machine cycle. Because a sorter machine cycle does not begin until a document passes phototransistor 24, the sorter shift registers need only store the signals for the number of cycles required for a document to pass from phototransistor 24 to the respective stacker or conveyor. For example, for the layout shown in FIG. 1, shift register 102 is programmed to store a signal for stacker 27 for two cycles. That is, it is a two-stage shift register. Similarly, shift register 104 stores a signal for stacker 28 for three cycles and so on. Shift register 110, which passes signals destined to control the conveyor 35 has seven stages to store a signal for the seven cycles required for a document to pass from phototransistor 24 to the end of the sorter.

The sorter shift register outputs control respective relays 112, 114, 116, 118 and 120 which actuate respective sorter stacking clutches 122, 124, 126, 128, and 130. Although the contacts in the one or more relays activated by the sorter shift register outputs will be closed for an entire sorter machine cycle, the respective clutches will not be activated until relay 132 is closed by a gating signal. That gating signal occurs at a predetermined time within each cycle.

The output from shift register 110 is passed through NAND gate 134 to activate relay 136. With relay 136 closed, power is applied to the clutch for output conveyor 35. The second input to NAND gate 134 is high during the entire period of each cycle; thus, when power is applied to the conveyor 35, it is for an entire sorter cycle.

Clock signal 111 from one-shot 142 as well as the gating signal to relay 132 are taken from a sorter cycling control circuit 140. The sorter cycling control circuit, to be described subsequently, initiates each sorter cycle each time a document is detected by phototransistor 24. The signal from phototransistor 24 is applied to the cycling control circuit through amplifier 146. Once a cycle is initiated, the sorter cycling control breaks the cycle into ten increments in timed relationship with a continuously operating drive shaft 148 in the sorter machine. The cycling control circuit is synchronized to the drive shaft by means of an optical encoder disc 150 mounted to the shaft and a phototransistor 152. The shaft 148 makes two revolutions per machine cycle and thus five holes are provided in code disc 150. Timing signals from phototransistor 152 are passed to the cycling control circuit by an amplifier 154.

In addition to the sorter-register clocking signal and the stacking clutch gating signal, the sorter cycling control also provides a pin clutch signal and a chain clutch signal at predetermined times within each cycle. The pin clutch operates a pin which positions the documents under respective stackers. The chain clutch operates a chain indexing system which moves each document from one position to the next.

If, between cycles, a document is detected by any of the phototransistors 36, 38, 40 and 42, the signal, applied through amplifier 164 to the cycling control circuit, sets a fault condition to open relay 166 and thereby stop the inserter machine.

Figure 3:
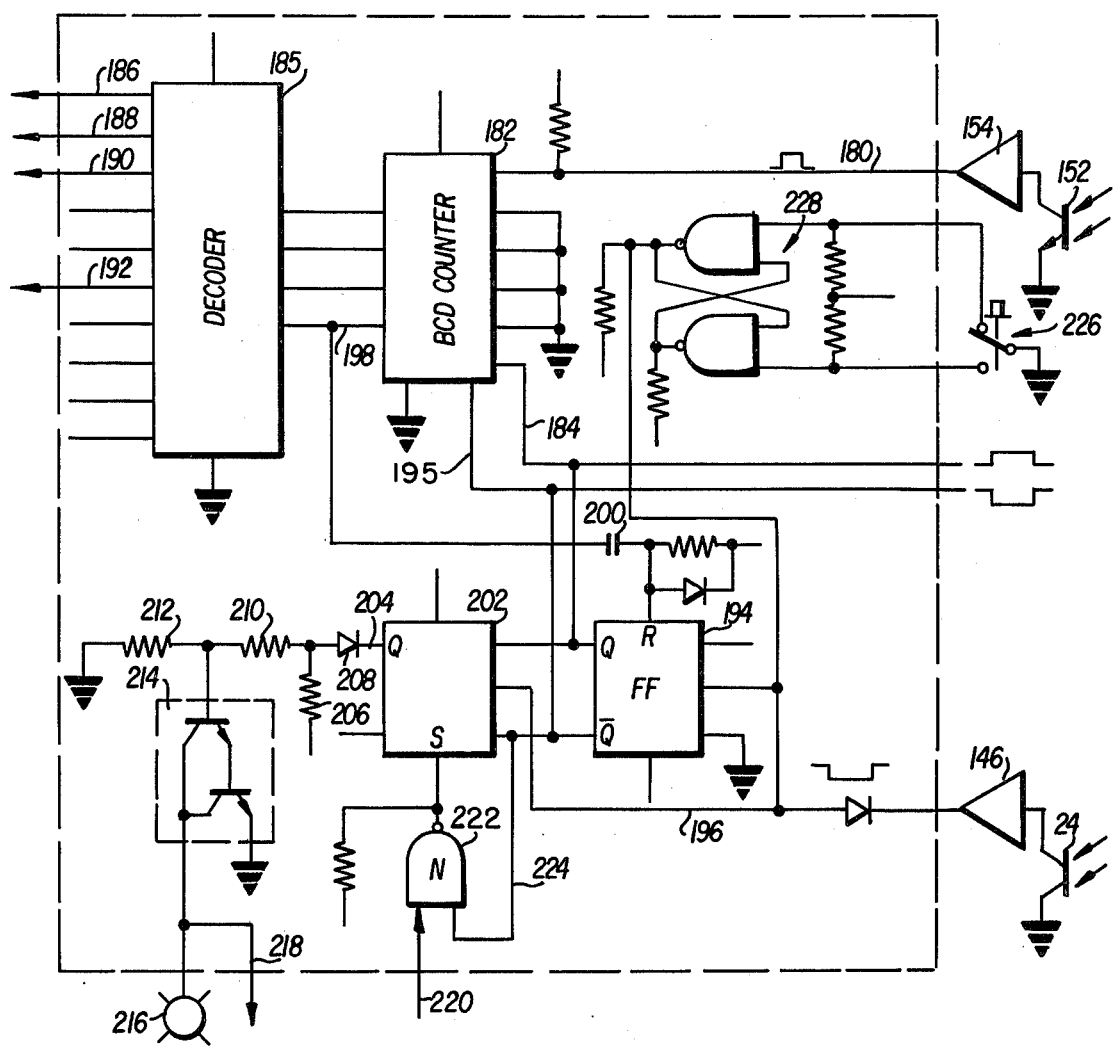
FIG. 3 is a schematic of a sorter cycling control used in the control system of FIG. 1.

Referring now to FIG. 3, the sorter cycling control circuit will be described. As already noted, by means of encoder disc 150 a series of timing signals are applied to the cycle control circuit through an amplifier 154. The timing signals on line 180 are applied to the input of a BCD counter 182. Although timing signals are present on line 180 so long as the continuously driven drive shaft is in operation, the signals will only be counted when a cycle initiating signal is on line 184. Once a count has been initiated, the timing signals will be counted, giving a BCD output to a BCD to decimal decoder 185. The BCD count will be decoded in decoder 185 to give sequential outputs along ten output lines. Thus, after an initiating signal is received on line 184, there will be a first pulse on line 186 followed by a pulse on line 188, and so on. The pulse on line 186 provides the clock signal to the sorter registers. The pulse on line 188 provides the gating signal to the stacker clutches to connect the stackers to the continuously driven drive shaft 148. Pulses on lines 190 and 192 respectively control the pin and chain clutches. Additional outputs may be tapped for controlling additional operative elements of the machine as necessary.

The cycle initiating signal on line 184 is provided by a flip-flop 194. The Q output of flip-flop 194 is clocked to a high level when a timing signal is received on line 196 from the document detecting phototransistor 24 as described above. The Q output of flip-flop 194 will remain high until reset at the end of a cycle. Once BCD counter 182 has counted to ten, the signal on line 198 will go from a high to a low. This change to a low state places a low level at the reset input to flip-flop 194 through coupling capacitor 200. The flip-flop is thereby reset to remove the cycle initiation signal from line 184. Also, with flip-flop 194 reset, a reset signal will be applied from its $\overline{Q}$ output to reset the BCD counter on line 195.

In order to provide for fault detection, a second flip-flop 202 is connected in series with flip-flop 194. If flip-flop 202 receives a timing signal from line 196 while the Q output to flip-flop 194 is still high the Q output of flip-flop 202 will go high to provide a fault signal. On the other hand, if flip-flop 194 is reset before the next timing signal, the Q output to flip-flop 202 will remain low and thus no fault signal will be given.

When flip-flop output line 204 goes high, current flowing through resistor 206 will no longer pass through diode 208. Instead, the current will pass through a voltage divider comprising resistors 210 and 212 to trigger a Darlington switch 214. The Darlington switch operates an indicator 216 and opens relay 166 (FIG. 2) through line 218 in order to turn off the inserter and thereby prevent additional documents from entering the sorter. The fault flip-flop 202 will be reset when power is reapplied to the inserter.

Fault flip-flop 202 may also be triggered by phototransistors 36, 38, 40 and 42. A signal from the phototransistors is applied on line 220 to NAND gate 222. The other input to the NAND gate is taken from the $\overline{Q}$ output of flip-flop 194. Thus, the output from NAND 222 will be low only when a cycle has been completed and a detecting signal is still on line 220. The low output from NAND 222 will set the fault flip-flop 202 which then controls the fault circuitry as already described.

A cycle may be initiated without the detection of a document by a manual switch 226. This switch is connected to a contact bounce eliminating flip-flop 228 which provides a timing signal to flip-flop 194.

It can be seen from the above description that the sorter cycling control will automatically provide cycling signals for one machine cycle once a document has been detected without the requirement of any mechanical connections to the preceding inserter machine. The only requirement is that the speed of the continuously driven drive shaft 148 of the sorter be such that the time period of one sorter cycle is less than the time period for one inserter cycle. However, if the inserter should be faster than the sorter, the automatic fault detecting circuitry will turn the inserter off.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. Cycle control means in a document processing machine of the type having a continuously-acting drive means and in which documents move in seriatim past different ones of a plurality of stations during each machine cycle, and wherein selected documents are operated on at selected stations, said cycle control means comprising:
    encoder means for developing timing signals in timed relation to said continuously-acting drive means;
    sequencing means for developing a sequence of parallel control signals in a single cycle in timed relation to said timing signals, operation of said sequencing means being initiated by a cycle initiation signal;
    means for detecting a document in the document processing machine and means for producing said cycle initiation signal on detection of the document, said means for producing said cycle initiation signal being a first bi-stable device which changes state when a document detection signal is applied thereto; and,
    means responsive to at least one of said control signals for connecting operative elements of said document processing machine to said continuously-acting drive means for operating on each of said documents.

2. The cycle control means of claim 1 wherein said sequencing means comprises a decoder in series with a counter.

3. The cycle control means of claim 1 further comprising a fault detector means for giving a fault indication when a document detection signal is received while said first bistable device is providing a cycle initiation signal.

4. Cycle control means of claim 3 wherein said fault detecting means comprises a second bi-stable device in series with the first bi-stable device and clocked by said document detection signal.

5. The cycle control means of claim 3 wherein said second bi-stable device will be set in its fault condition when a document is detected in a fault location between machine cycles.

6. A cycle control means in a document sorting machine of the type having a continuously rotating drive shaft and in which documents move in seriatim past different ones of a plurality of stations during each machine cycle, and wherein selected documents are stacked at selected stations, said cycle control means comprising:
    an optical encoder for developing timing signals in timed relation to said continuously rotating drive shaft;
    counter means for developing a sequence of parallel control signals in a single cycle in timed relation to said timing signals, operation of said counter means being initiated by a cycle initiation signal;
    means for detecting a document in the document sorting machine, and for producing a detection signal;
    a first bi-stable device for producing said cycle initiation signal in response to said detection signal and for retaining the cycle initiation signal at its output;
    means responsive to the completion of said sequence of parallel control signals in a single cycle for resetting said bi-stable device and thus removing the cycle initiation signal from the output of the bi-stable device; and
    clutch means responsive to at least one of said control signals for connecting operative elements of said document sorting machine to said continuously rotating drive shaft for stacking selected ones of said documents at selected stations.

7. The cycle control means of claim 6 wherein said counter means comprises a decoder in series with a binary coded decimal counter.

8. The cycle control means of claim 6 further comprising a fault detector means for giving a fault indication when a document detection signal is received while said first bi-stable device is providing a cycle initiation signal.

9. The cycle control means of claim 8 wherein said fault detecting means comprises a second bi-stable device in series with the first bi-stable device and clocked by said document detection signal.

10. The cycle control means of claim 9 wherein said second bi-stable device will be set in its fault condition when a document is detected in a fault location between machine cycles.

* * * * *